(12) United States Patent
Kang et al.

(10) Patent No.: US 10,925,291 B2
(45) Date of Patent: Feb. 23, 2021

(54) DRY AGING SYSTEM USING OXYGEN

(71) Applicants: Youn Je Chun, Seoul (KR); Sang Min Kim, Namyangju-si (KR)

(72) Inventors: Won ho Kang, Seoul (KR); Sang Min Kim, Namyangju-si (KR)

(73) Assignees: Chun Youn Je, Seoul (KR); Kim Sang Min, Namyangju-si (KR)

( * ) Notice: Subject to any disclaimer, the term of this patent is extended or adjusted under 35 U.S.C. 154(b) by 287 days.

(21) Appl. No.: 16/157,513

(22) Filed: Oct. 11, 2018

(65) Prior Publication Data

US 2019/0110490 A1 Apr. 18, 2019

(30) Foreign Application Priority Data

Oct. 16, 2017 (KR) .................... 10-2017-0133874

(51) Int. Cl.

| | |
|---|---|
| A23B 4/16 | (2006.01) |
| A23B 7/148 | (2006.01) |
| A23L 13/70 | (2016.01) |
| F26B 21/14 | (2006.01) |
| A23L 3/3418 | (2006.01) |
| A23B 4/06 | (2006.01) |
| F26B 21/08 | (2006.01) |
| A23L 3/36 | (2006.01) |

(Continued)

(52) U.S. Cl.
CPC ............... *A23B 4/16* (2013.01); *A23B 4/037* (2013.01); *A23B 4/066* (2013.01); *A23B 4/08* (2013.01); *A23B 4/09* (2013.01); *A23B 7/148* (2013.01); *A23L 3/3418* (2013.01); *A23L 3/36* (2013.01); *A23L 3/40* (2013.01); *A23L 13/76* (2016.08); *F26B 5/04* (2013.01); *F26B 21/08* (2013.01); *F26B 21/14* (2013.01); *A23V 2002/00* (2013.01)

(58) Field of Classification Search
CPC .. A23B 4/16; A23B 4/09; A23B 4/037; A23V 2002/00
USPC ............ 62/52.1, 78, 239; 426/236, 300, 312
See application file for complete search history.

(56) References Cited

U.S. PATENT DOCUMENTS

| | | | | |
|---|---|---|---|---|
| 2,563,364 | A * | 8/1951 | Proctor | A01K 63/02 426/2 |
| 3,508,881 | A * | 4/1970 | Hagenauer | F25D 11/00 422/62 |
| 2016/0245555 | A1* | 8/2016 | Tanaka | F25B 17/02 |

FOREIGN PATENT DOCUMENTS

| | | |
|---|---|---|
| JP | 01-174368 A | 7/1989 |
| JP | 2010-213600 A | 9/2010 |

(Continued)

*Primary Examiner* — Thien S Tran
(74) *Attorney, Agent, or Firm* — Novick, Kim & Lee, PLLC; Jae Youn Kim (57) ABSTRACT

Provided is a dry aging system using oxygen in which a separate dry-aging room is provided in a refrigerating compartment, and a mixed gas using oxygen is supplied into the dry-aging room so as to solve a blacking and browning phenomenon of a meat surface, which is led to an increase in loss rate and an increase in edible meat cost, which are disadvantages of existing dry-aging, thereby allowing the meat surface to be maintained in a bright red color through meat color fixation, minimizing the occurrence of the blacking and browning phenomenon to reduce the loss rate of the edible meat, and supplying flavorful dry-aged meat at a more reasonable price. Also, the blacking and browning phenomenon occurring on the generally dry-aged meat may be significantly reduced to produce aesthetically and tastefully very superior dry-aged meat.

6 Claims, 4 Drawing Sheets

(51) Int. Cl.
*A23B 4/08* (2006.01)
*F26B 5/04* (2006.01)
*A23L 3/40* (2006.01)
*A23B 4/037* (2006.01)
*A23B 4/09* (2006.01)

(56) References Cited

FOREIGN PATENT DOCUMENTS

| | | |
|---|---|---|
| KR | 20-0450516 Y1 | 10/2010 |
| KR | 10-1533715 B1 | 7/2015 |
| KR | 10-2017-0044607 A | 4/2017 |

* cited by examiner

Incubator Monitoring System — 210

| No.01 INCUBATOR | |
|---|---|
| VACUUM | 0.0 kg/cm |
| PRESSURE | 0.0 kg/cm |
| GAS O2 | 0.0 |
| CO2 | 0.0 |
| TEMPERATURE | 0.0 °C |
| HUMIDITY | 0.0 mg/nm |

| No.02 INCUBATOR | |
|---|---|
| VACUUM | 0.0 kg/cm |
| PRESSURE | 0.0 kg/cm |
| GAS O2 | 0.0 |
| CO2 | 0.0 |
| TEMPERATURE | 0.0 °C |
| HUMIDITY | 0.0 mg/nm |

| No.03 INCUBATOR | |
|---|---|
| VACUUM | 0.0 kg/cm |
| PRESSURE | 0.0 kg/cm |
| GAS O2 | 0.0 |
| CO2 | 0.0 |
| TEMPERATURE | 0.0 °C |
| HUMIDITY | 0.0 mg/nm |

| No.04 INCUBATOR | |
|---|---|
| VACUUM | 0.0 kg/cm |
| PRESSURE | 0.0 kg/cm |
| GAS O2 | 0.0 |
| CO2 | 0.0 |
| TEMPERATURE | 0.0 °C |
| HUMIDITY | 0.0 mg/nm |

| No.05 INCUBATOR | |
|---|---|
| VACUUM | 0.0 kg/cm |
| PRESSURE | 0.0 kg/cm |
| GAS O2 | 0.0 |
| CO2 | 0.0 |
| TEMPERATURE | 0.0 °C |
| HUMIDITY | 0.0 mg/nm |

| No.06 INCUBATOR | |
|---|---|
| VACUUM | 0.0 kg/cm |
| PRESSURE | 0.0 kg/cm |
| GAS O2 | 0.0 |
| CO2 | 0.0 |
| TEMPERATURE | 0.0 °C |
| HUMIDITY | 0.0 mg/nm |

FIG. 3

[Ratio of oxygen, carbon dioxide, nitrogen, which are contained in mixed gas]

| Order | Oxygen | Carbon dioxide | Nitrogen | Humidity |
|---|---|---|---|---|
| 1 | 8 | 2 | 0 | 50% |
| 2 | 7 | 2 | 1 | 45% |
| 3 | 6 | 2 | 2 | 40% |
| 4 | 5 | 2 | 3 | 35% |
| 5 | 4 | 2 | 4 | 30% |
| 6 | 3 | 2 | 5 | 25% |
| 7 | 2 | 2 | 6 | 20% |

[Settable gas and humidty in each of dry-aging rooms]

FIG. 4

DRY AGING SYSTEM USING OXYGEN

CROSS-REFERENCE TO RELATED APPLICATIONS

The present application claims priority under 35 U.S.C. 119 and 35 U.S.C. 365 to Korean Patent Application No. 10-2017-0133874, filed on Oct. 16, 2017, which is hereby incorporated by reference in its entirety.

BACKGROUND

The present invention relates to a dry aging system using oxygen, and more particularly, to a dry aging system using oxygen, which is capable of minimizing a loss of a meat product, which occurs in an existing dry aging system, through meat color fixation.

An aging method that is being popularly used in at the present is a revolutionary method capable of reducing a loss of meat due to the creation of a vacuum packaging method in the 1960s. In the 1980s, more than 90% of the global meat distribution has been distributed in the vacuum packaging method.

A wet aging process in which edible meat that has undergone rigor mortis is aged in a vacuum-packaged state is an effective method for preventing oxidation and moisture evaporation of the edible meat from occurring during storage, preventing aerobic bacteria from being grown through oxygen removal, enhancing moisture evaporation suppression and flavor, and improving tenderness.

On the other hand, dry-aging was used as a sole aging method that is mainly used in times when the packing technology is not developed.

The dry-aging is a method in which edible meat is hung to be stored in a refrigerating compartment. Here, an aging period has to be maintained for 10 day to 40 days, a storage temperature has to be maintained at 1 degree to 3 degrees, humidity has to be maintained at 70% to 80%, and an intensity of wind has to be maintained at 2 m/s to 5 m/s so as to facilitate ventilation so that the meat is evenly dried to be aged.

This dry-aging method is seemed to disappear, but in the late 90s, it is revived with memorable tastes in the central and eastern United States to stand out again, and Korea has also been regarded as one of the items popular with steak culture.

However, a savory taste compound (amino acid) is condensed to improve flavor so that a user tastes more luxurious food, which is advantage of the dry-aging, but about 20% to about 30% of a side surface of the aged meat has to be removed due to a blacking and browning phenomenon of the meat surface, which occurs as a disadvantage. As a result, this is led to an increase in loss rate and an increase in edible meat cost.

Thus, even if the advantage of the dry-aging is known, it is not universal, and there is an inconvenience in transferring expensive costs to the consumers when purchasing the aged meat.

SUMMARY

The present invention provides a dry aging system in which a separate dry-aging room is provided in a refrigerating compartment, and a mixed gas using oxygen is supplied into the dry-aging room so as to solve a blacking and browning phenomenon of a meat surface, which is led to an increase in loss rate and an increase in edible meat cost, which are disadvantages of existing dry-aging, thereby allowing the meat surface to be maintained in a bright red color through meat color fixation, minimizing the occurrence of the blacking and browning phenomenon to reduce the loss rate of the edible meat, and supplying flavorful dry-aged meat at a more reasonable price.

In one embodiment, a dry aging system using oxygen includes: a refrigerating compartment; one or more dry-aging rooms installed in the refrigerating compartment; a vacuum pump configured to vacuumize the insides of the one or more dry-aging rooms; an oxygen tank configured to store oxygen; a carbon dioxide tank configured to store carbon dioxide; a gas mixer configured to mix the oxygen supplied from the oxygen tank with the carbon dioxide supplied from the carbon dioxide tank; a cooling pipe installed in the refrigerating compartment and configured to cool the mixed gas supplied from the gas mixer and supply the cooled mixed gas into the one or more dry-aging rooms; a humidity controller configured to supply moisture into the one or more dry-aging rooms; and a controller configured to separately control the one or more dry-aging rooms, configured to set a ratio of the oxygen and the carbon dioxide, which are supplied into each of the dry-aging rooms so as to supply the mixed gas, and configured to periodically detect the ratio of the oxygen and the carbon dioxide within the dry-aging room so that, if the detected ratio is different from the set value, the vacuum pump is driven to vacuumize the inside of the dry-aging room and to supply the mixed gas corresponding to the set value again into the dry-aging room by using the gas mixer.

The dry aging system may further include a nitrogen tank configured to store nitrogen, wherein the gas mixer may mix the oxygen supplied from the oxygen tank, the carbon dioxide supplied from the carbon dioxide tank, and the nitrogen supplied from the nitrogen tank with each other, and the controller may set a ratio of the oxygen, the carbon dioxide, and the nitrogen, which are supplied into each of the dry-aging rooms, to supply a mixed gas and periodically detects the ratio of the oxygen, the carbon dioxide, and the nitrogen within the dry-aging room so that, if the detected ratio is different from the set value, the vacuum pump is driven to vacuumize the inside of the dry-aging room and to supply the mixed gas corresponding to the set value again into the dry-aging room by using the gas mixer.

When a ratio of the carbon dioxide is fixed, and a ratio of the oxygen increases, the controller may supply the mixed gas while decreasing the ratio of the nitrogen and control the humidity controller to increase in humidity, and when the ratio of the carbon dioxide is fixed, and the ratio of the oxygen decreases, the controller may supply the mixed gas while increasing a ratio of the nitrogen and control the humidity controller to decrease in humidity.

The ratio of the carbon dioxide may be fixed to 20%, the oxygen may be contained at a ratio of 20% to 80%, and the nitrogen may be contained at a ratio of 0% to 60%, wherein, when the ratio of the oxygen increases, the controller may supply the mixed gas while decreasing the ratio of the nitrogen, and when the ratio of the oxygen decreases, the controller may supply the mixed gas while increasing the ratio of the nitrogen.

When the ratio of the nitrogen is 0%, the controller may control the humidity controller to allow the humidity within the dry-aging room to become 50%, and when the ratio of the nitrogen is 60%, the controller may control the humidity controller to allow the humidity within the dry-aging room to become 15% to 20% so that when the ratio of the nitrogen is low, the humidity increases, and when the ratio of the nitrogen is high, the humidity decreases.

A measuring sensor configured to measure and analyze a ratio of the oxygen, the carbon dioxide, and the nitrogen may be provided in each of the dry-aging rooms, and the controller may periodically detect the ratio of the oxygen, the carbon dioxide, and the nitrogen within the dry-aging room.

The cooling pipe may be provided in a separate housing within the refrigerating compartment and has a shape that is repeatedly bent in an S shape, and a cooling gas storage unit configured to store the cooled mixed gas and having a diameter greater than that of the cooling pipe may be provided at a rear end of the pipe that is bent in the S shape to secure a supply amount of cooled mixed gas to be supplied to one or more dry-aging rooms.

The details of one or more embodiments are set forth in the accompanying drawings and the description below. Other features will be apparent from the description and drawings, and from the claims.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE EMBODIMENTS

Advantages and features of the present invention, and implementation methods thereof will be clarified through following embodiments described with reference to the accompanying drawings.

The present disclosure may, however, be embodied in different forms and should not be construed as limited to the embodiments set forth herein.

In this specification, these embodiments are provided so that this disclosure will be thorough and complete, and will fully convey the scope of the present invention to those skilled in the art.

Also, the present invention is only defined by scopes of claims.

Accordingly, in some embodiments, well-known components, well-known device operations, and well-known techniques will not be described in detail to avoid ambiguous interpretation of the present invention.

Also, like reference numerals refer to like elements throughout. In the following description, the technical terms in this specification are used (mentioned) only for explaining a specific exemplary embodiment while not limiting the present invention.

The terms of a singular form may include plural forms unless referred to the contrary. The meaning of "include," "comprise," "including," or "comprising," specifies a component and an operation but does not exclude other components and operations.

Unless terms used in the present invention are defined differently, all terms (including technical and scientific terms) used in this specification have the same meaning as generally understood by those skilled in the art.

Also, unless defined apparently in the description, the terms as defined in a commonly used dictionary are not ideally or excessively construed as having formal meaning.

Hereinafter, exemplary embodiments of the prevent invention will be described below in more detail with reference to the accompanying drawings.

Referring to FIGS. 1 to 4, a dry aging system 100 using oxygen includes a refrigerating compartment 110, one or more dry-aging rooms 120 installed in the refrigerating compartment 110, a vacuum pump 130 vacuumizing the insides of the one or more dry-aging rooms 120, an oxygen tank 140 storing oxygen, a carbon dioxide tank 150 storing carbon dioxide, a gas mixer 170 mixing the oxygen supplied from the oxygen tank 140 with the carbon dioxide supplied from the carbon dioxide tank 150, a cooling pipe 180 installed in the refrigerating compartment 110 and cooling the mixed gas supplied from the gas mixer 170 and supplying the cooled mixed gas into the one or more dry-aging rooms 120, a humidity controller 190 supplying moisture into the one or more dry-aging rooms 120, and a controller 200 separately controlling the one or more dry-aging rooms 120, setting a ratio of the oxygen and the carbon dioxide, which are supplied into each of the dry-aging rooms 120 to supply the mixed gas, and periodically detecting the ratio of the oxygen and the carbon dioxide within the dry-aging room 120 so that, if the detected ratio is different from the set value, the vacuum pump 130 is driven to vacuumize the inside of the dry-aging room 120 and to supply the mixed gas corresponding to the set value again into the dry-aging room 120 by using the gas mixer 170.

Figure 1:
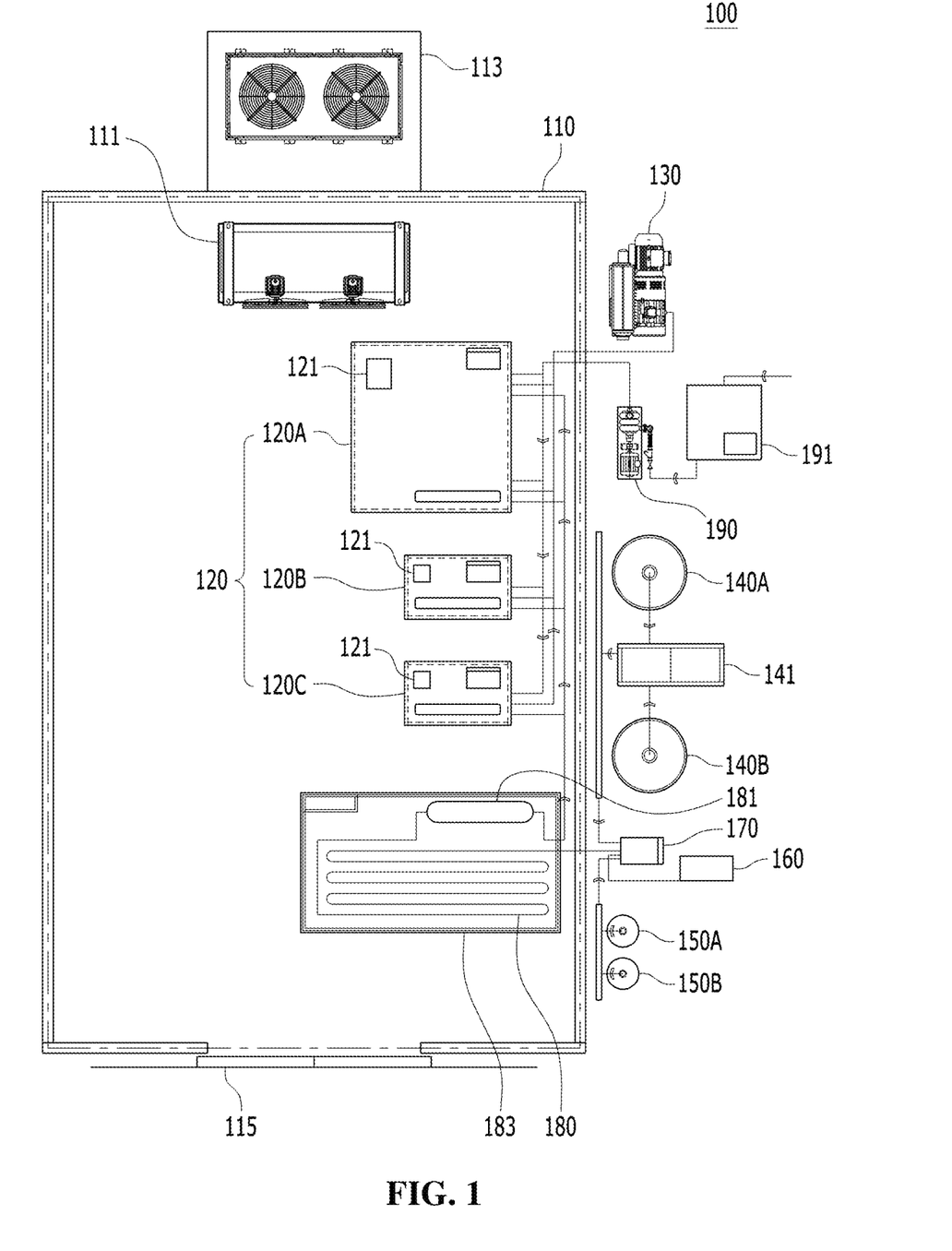
FIG. 1 is a view illustrating an overall structure of a dry aging system using oxygen according to an embodiment of the present invention.

Referring to FIG. 1, a condensing unit 113 is installed outside the refrigerating compartment 110, and a cooler 111 is installed inside the refrigerating compartment 110. Also, a slidable door 115 through which a worker is accessible is installed at one side of the refrigerating compartment 110.

FIG. 1 illustrates an example in which three dry-aging rooms 120A. 120B, and 120C are installed in the refrigerating compartment 110. The dry-aging rooms 120A. 120B, and 120C need not be the same size, but may have different sizes as necessary.

Each of the dry-aging rooms 120A. 120B, and 120C is provided with a transparent window through which an internal state of each of the dry-aging rooms 120A. 120B, and 120C is visually confirmed by using naked eyes. Also, a display unit for displaying states of vacuum, pressure, oxygen, carbon dioxide, nitrogen, temperature, humidity, etc. of the dry-aging room is provided on each of the dry-aging rooms 120A. 120B, and 120C.

The internal state of each of the dry-aging rooms 120A. 120B, and 120C may be set to values different from each other according to the setting of the controller 200 and may operate under different conditions so that edible meat is dried to be aged.

The dry aging system 100 using the oxygen may further include a nitrogen tank 160 supplying nitrogen.

The gas mixer 170 mixes the oxygen supplied from the oxygen tank 140, the carbon dioxide supplied from the carbon dioxide tank 150, and the nitrogen supplied from the nitrogen tank 160 with each other, and the controller 200 sets a ratio of the oxygen, the carbon dioxide, and the nitrogen, which are supplied into each of the dry-aging rooms 120, to supply a mixed gas and periodically detects the ratio of the oxygen, the carbon dioxide, and the nitrogen within the dry-aging room 120. Here, if the detected ratio is different from the set value, the vacuum pump 130 is driven to vacuumize the inside of the dry-aging room 120 and to supply the mixed gas corresponding to the set value again into the dry-aging room 120 by using the gas mixer 170.

Each of the dry-aging rooms 120A. 120B, and 120C is connected to a pipe receiving moisture from the humidity controller 190, a pipe connected to the vacuum pump 130 for vacuumizing the inside thereof, and a pipe receiving the mixed gas of the oxygen, the carbon dioxide, and the nitrogen through the gas mixer 170.

Each of the oxygen tank 140, the carbon dioxide tank 150, and the nitrogen tank 160 may be provided in two to stably supply the mixed gas into the dry aging room 120.

The humidity controller 190 is connected to a water tank 191 storing water, and the moisture is supplied to each of the dry-aging rooms 120A. 120B, and 120C by using the water stored in the water tank 191.

Figure 2:
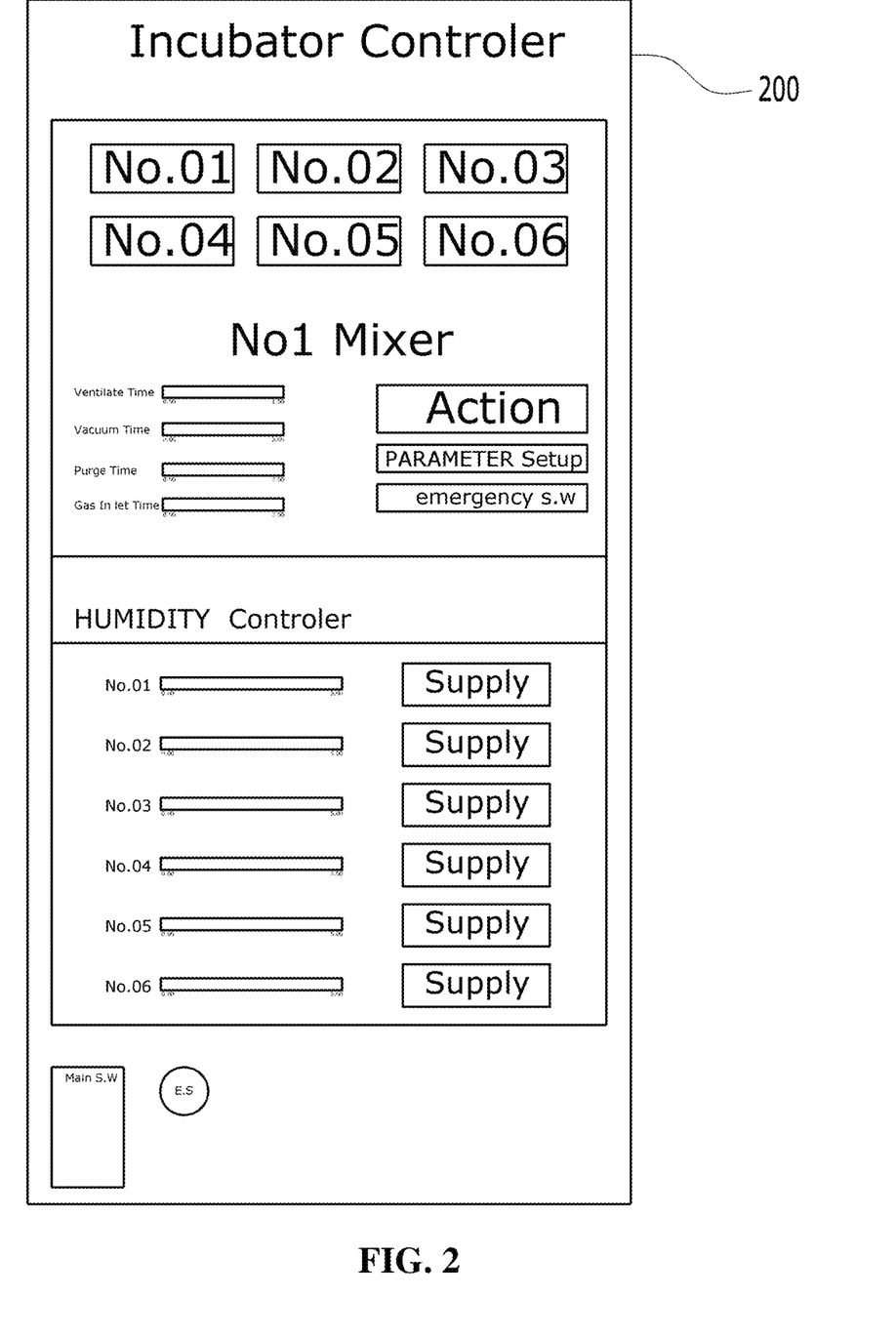
FIG. 2 is a conceptual view of a controller for controlling the dry aging system using the oxygen according to an embodiment of the present invention.

Referring to FIG. 2, the controller 200 includes a control panel that is set and confirmed by the user. The dry-aging room 120 to be set by the user among No. 1 to 6 dry-aging rooms 120 may be selected through the control panel. In FIG. 2, No. 01, No. 02, No. 03, No. 04, No. 05, and No. 06 are merely examples, and the number of dry-aging rooms 120 installed in the refrigerating compartment 110 may be more or less than six.

FIG. 2 illustrates an example in which a No. 1 mixer (dry-aging room) is selected by the user. A mixing ratio of oxygen, carbon dioxide, and nitrogen gases, vacuum, purge, ventilation, and humidity may be set for the No. 1 dry-aging room, and various progress states may be confirmed through a graph. Also, mist spraying may be performed on the selected dry-aging room.

Figure 3:
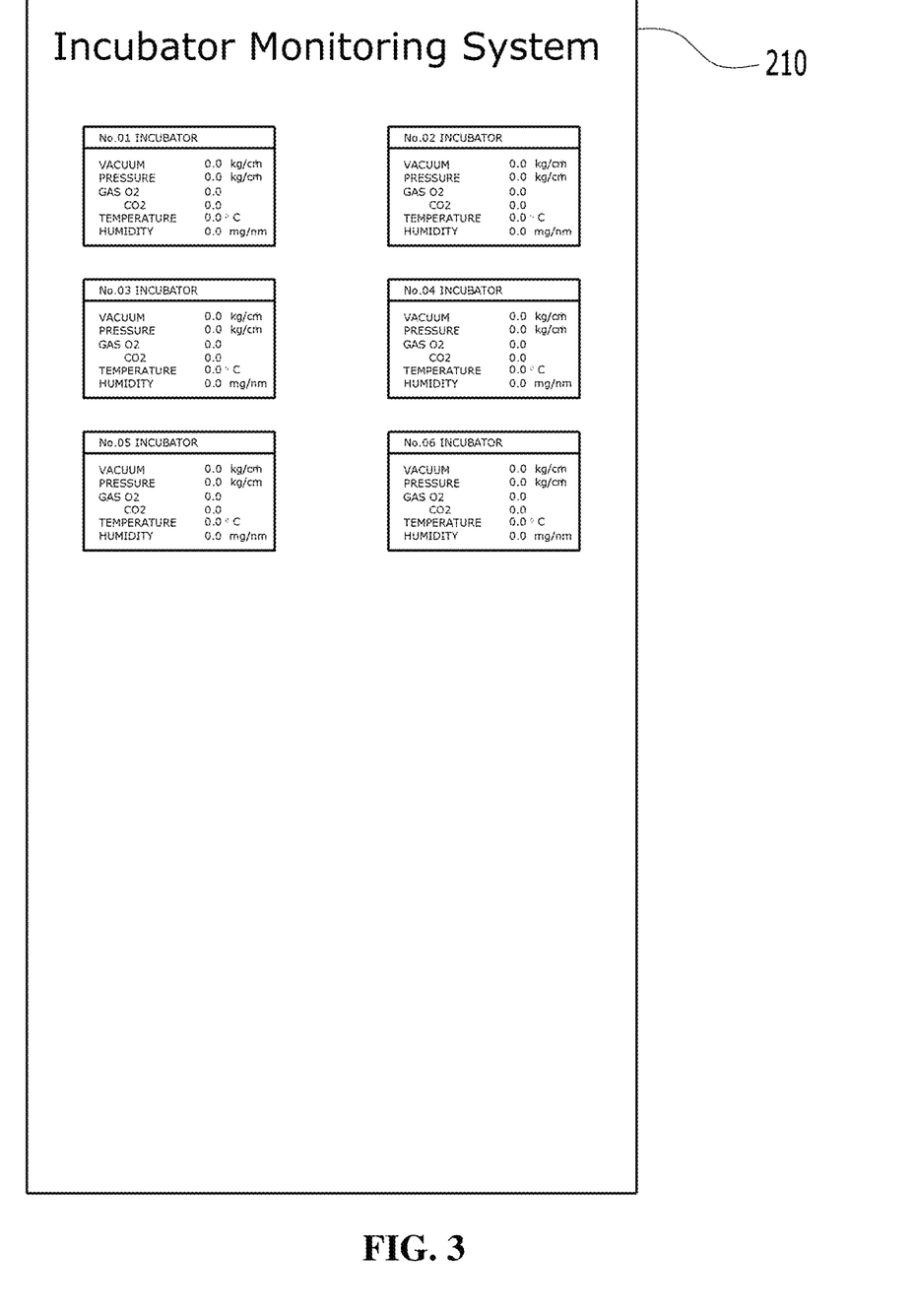
FIG. 3 is a conceptual view of a monitoring unit for monitoring a state of each of dry-aging rooms constituting the dry aging system using the oxygen according to an embodiment of the present invention.

Referring to FIG. 3, the monitoring unit 210 displays internal states of each of No. 01, No. 02, No. 03, No. 04, No. 05, and No. 06 dry-aging rooms 120. The internal states may represents states of vacuum, pressure, oxygen, carbon dioxide, nitrogen, temperature, humidity, and the like. The internal states may be different for each dry-aging room 120.

Figure 4:
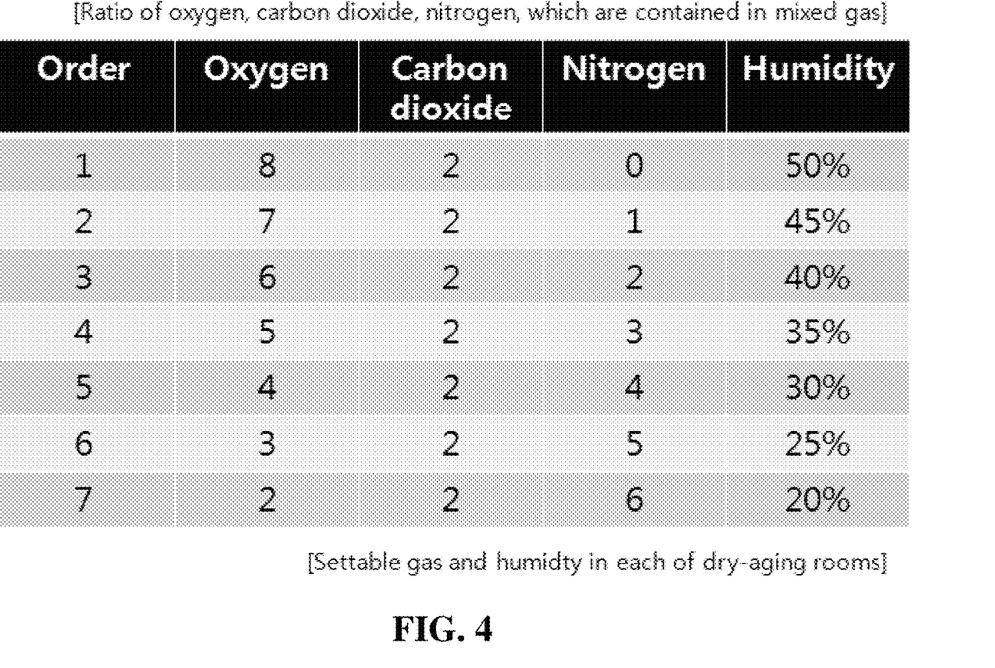
FIG. 4 is a view illustrating an example of a ratio of a mixed gas and humidity, which are set in each dry-aging room.

Referring to FIG. 4, the mixed gas injected into each of the dry-aging room 120 includes the oxygen, the carbon dioxide, and the nitrogen. When a ratio of the carbon dioxide is fixed, and a ratio of the oxygen increases, a ratio of the nitrogen may decreases.

The oxygen is important to maintain a hemoglobin level so that the edible meat is maintained in a bright red color. When the ratio of the oxygen increases, a degree of the bright red color is high, and when the ratio of the oxygen decreases, the degree of the bright red color is low. Meat having various aesthetic senses and taste senses may be processed according to the preference of the consumer.

That is, the color of edible meat may be maintained in the bright red color by using the oxygen, and the meat color may be fixed to prevent the blacking and browning phenomenon from occurring on the edible meat.

A ratio of the carbon dioxide is maintained as low as about 20%. This is done for suppressing propagation of microorganism by reducing (acidifying) a pH.

As a ratio of the nitrogen decreases, the humidity increases. As the ratio of the nitrogen increases, the humidity decreases. When the ratio of the nitrogen is high, the humidity has to be lowered so as to suppress the propagation of the microorganism.

As a result, to exhibit such an effect, when the ratio of the carbon dioxide is fixed, and the ratio of the oxygen increases, the controller 200 supplies the mixed gas while decreasing the ratio of the nitrogen and controls the humidity controller 190 to increase in humidity.

Also, when the ratio of the carbon dioxide is fixed, and the ratio of the oxygen decreases, the controller 200 supplies the mixed gas while increasing the ratio of the nitrogen and controls the humidity controller 190 to decrease in humidity.

Particularly, the ratio of the carbon dioxide is fixed to 20%, the oxygen is contained at a ratio of 20% to 80%, and the nitrogen is contained at a ratio of 0% to 60%. Here, when the ratio of the oxygen increases, the controller 200 supplies the mixed gas while decreasing the ratio of the nitrogen, and when the ratio of the oxygen decreases, the controller 200 supplies the mixed gas while increasing the ratio of the nitrogen.

When the ratio of the nitrogen is 0%, the controller 200 controls the humidity controller 190 so that the humidity within the dry-aging room 120 becomes 50%. When the ratio of the nitrogen is 60%, the controller 200 controls the humidity controller 190 so that the humidity within the dry-aging room 120 becomes 15% to 20%. Thus, when the ratio of the nitrogen is low, the humidity increases, and when the ratio of the nitrogen is high, the humidity decreases.

FIG. 4 is merely an example. For example, the ratio of the oxygen may be set between 20% to 80%, and the ratio of the nitrogen may be set between 0% to 60%. The humidity may be at most 50% and at least 15% to 20%.

A measuring sensor 121 for measuring and analyzing the ratio of the oxygen, the carbon dioxide, and the nitrogen is provided in each of the dry-aging rooms 120.

The controller 200 may periodically detect the ratio of the oxygen, the carbon dioxide, and the nitrogen within each of the dry-aging rooms 120 by using the measuring sensor 121.

The controller 200 compares a state value of each of the dry-aging rooms 120, which is detected by using the measuring sensor 121, with a preset value. Here, if the detected state value is different from the preset value, the vacuum pump 130 is driven to vacuumize the inside of the dry-aging room 120 and then supply the mixed gas corresponding to the set value into the corresponding dry-aging room 120 by using the gas mixer 170.

The cooling pipe 180 is provided in a separate housing 183 within the refrigerating compartment 110 and has a shape that is repeatedly bent in an S shape. A cooling gas storage unit 181 storing the cooled mixed gas and having a diameter greater than that of the cooling pipe 180 is provided at a rear end of the pipe 180 that is bent in the S shape to secure a supply amount of cooled mixed gas to be supplied to one or more dry-aging rooms 120. A large amount of cooled mixed gas is stored in the cooling gas storage unit 181, and the mixed gas is supplied to each of the dry-aging rooms 120 by using the cooling gas storage unit 181.

The pipe 180 that is bent in the S shape may have a diameter of about 15 mm and a length of about 6 m. When the cooling gas storage unit 181 has a diameter of about 150 mm and a capacity of about 1,500 L, a large amount of cooled mixed gas may be sufficiently secured. The cooled mixed gas secured in the cooling gas storage unit 181 is supplied into the dry-aging room 120 through the pipe 180.

As described above, since the dry-aging rooms using the oxygen are provided in the refrigerating compartment, the blacking and browning phenomenon of the meat surface, which occurs in the generally dry-aged meat, may be minimized. Also, the aging may be maintained for a predetermined period to produce the aesthetically and tastefully very superior dry-aged meat.

In addition, the combination (myoglobin->oxymyoglobin) of the meat color and the oxygen may allow the color of the meat surface to be maintained in the bright red color for a long time. In addition, the blacking and browning phenomenon, which may occur during the aging, may be minimized to absolutely reduce the loss rate of the aged meat.

Particularly, in a modified atmosphere packaging (MAP) of the meat, since the oxygen is maintained at a concentration of 30% to 80%, the meat color may be maintained in the bright red color even through the meat is stored for a long time.

According to the present invention having the above-described constitutions, the following effects may be attained.

First, the blacking and browning phenomenon occurring on the generally dry-aged meat may be significantly reduced through the meat color fixation to produce the aesthetically and tastefully very superior dry-aged meat.

Second, the loss rate of the spoiled aged meat, which is cut by the blacking and browning phenomenon that occurs in the generally dry-aged meat, may be reduced to less than 5% that is much less than 20% to 30% that is the loss rate according to the related art.

Third, on the general consumers, due to this reduction in loss rate, the consumers may enjoy the dry-aged meat at the more reasonable price.

The present invention is not limited to the foregoing specific preferred embodiment, and also it will be understood by those of ordinary skill in the art that various changes in form and details may be made therein without departing from the spirit and scope of the present invention as defined by the following claims.

What is claimed is:

1. A dry aging system using oxygen, comprising:
a refrigerating compartment;
one or more dry-aging rooms installed in the refrigerating compartment;
a vacuum pump configured to vacuumize insides of the one or more dry-aging rooms;
an oxygen tank configured to store oxygen;
a carbon dioxide tank configured to store carbon dioxide;
a gas mixer configured to mix the oxygen supplied from the oxygen tank with the carbon dioxide supplied from the carbon dioxide tank;
a cooling pipe installed in the refrigerating compartment and configured to cool a mixed gas supplied from the gas mixer and supply the cooled mixed gas into the one or more dry-aging rooms;
a humidity controller configured to supply moisture into the one or more dry-aging rooms; and
a controller configured to separately control the one or more dry-aging rooms, configured to set a ratio of the oxygen and the carbon dioxide, which are supplied into each of the dry-aging rooms so as to supply the mixed gas, and configured to periodically detect the ratio of the oxygen and the carbon dioxide within the one or more dry-aging rooms so that, when the detected ratio is different from a set value, the vacuum pump is driven to vacuumize the insides of the one or more dry-aging rooms and to supply the mixed gas corresponding to the set value again into the one or more dry-aging rooms by using the gas mixer, wherein the cooling pipe is provided in a separate housing within the refrigerating compartment and has a shape that is repeatedly bent in an S shape, and
a cooling gas storage configured to store the cooled mixed gas and having a diameter greater than that of the cooling pipe is provided at a rear end of the cooling pipe that is bent in the S shape to secure a supply amount of the cooled mixed gas to be supplied to the one or more dry-aging rooms.

2. The dry aging system of claim 1, further comprising a nitrogen tank configured to store nitrogen,
wherein the gas mixer mixes the oxygen supplied from the oxygen tank, the carbon dioxide supplied from the carbon dioxide tank, and the nitrogen supplied from the nitrogen tank with each other, and
the controller sets a ratio of the oxygen, the carbon dioxide, and the nitrogen, which are supplied into each of the one or more dry-aging rooms, to supply a mixed gas of the oxygen, carbon dioxide and nitrogen, and periodically detects the ratio of the oxygen, the carbon dioxide, and the nitrogen within the one or more dry-aging rooms so that, when the detected ratio is different from the set value, the vacuum pump is driven to vacuumize the insides of the one or more dry-aging rooms and to supply the mixed gas of the oxygen, carbon dioxide and nitrogen corresponding to the set value again into the one or more dry-aging room by using the gas mixer.

3. A dry aging system using oxygen, comprising:
a refrigerating compartment;
one or more dry-aging rooms installed in the refrigerating compartment;
a vacuum pump configured to vacuumize insides of the one or more dry-aging rooms;
an oxygen tank configured to store oxygen;
a carbon dioxide tank configured to store carbon dioxide;
a nitrogen tank configured to store nitrogen;
a gas mixer configured to mix the oxygen supplied from the oxygen tank, the carbon dioxide supplied from the carbon dioxide tank, and the nitrogen supplied from the nitrogen tank with each other;
a cooling pipe installed in the refrigerating compartment and configured to cool a mixed gas supplied from the gas mixer and supply the cooled mixed gas into the one or more dry-aging rooms;
a humidity controller configured to supply moisture into the one or more dry-aging rooms; and
a controller configured to separately control the one or more dry-aging rooms, configured to set a ratio of the oxygen, the carbon dioxide, and the nitrogen, which are supplied into each of the one or more dry-aging rooms, to supply the mixed gas of the oxygen, carbon dioxide and nitrogen, and periodically detects the ratio of the oxygen, the carbon dioxide, and the nitrogen within the one or more dry-aging rooms so that, when the detected ratio is different from the set value, the vacuum pump is driven to vacuumize the insides of the one or more dry-aging rooms and to supply the mixed gas of the oxygen, carbon dioxide and nitrogen corresponding to the set value again into the one or more dry-aging room by using the gas mixer,
wherein, when a ratio of the carbon dioxide is fixed, and a ratio of the oxygen increases, the controller supplies the mixed gas while decreasing a ratio of the nitrogen and controls the humidity controller to increase in humidity, and when the ratio of the carbon dioxide is fixed, and the ratio of the oxygen decreases, the controller supplies the mixed gas while increasing the ratio of the nitrogen and controls the humidity controller to decrease in humidity.

4. A dry aging system using oxygen, comprising:
a refrigerating compartment;
one or more dry-aging rooms installed in the refrigerating compartment;
a vacuum pump configured to vacuumize insides of the one or more dry-aging rooms:
an oxygen tank configured to store oxygen;
a carbon dioxide tank configured to store carbon dioxide;
a nitrogen tank configured to store nitrogen;
a gas mixer configured to mix the oxygen supplied from the oxygen tank, the carbon dioxide supplied from the carbon dioxide tank, and the nitrogen supplied from the nitrogen tank with each other;
a cooling pipe installed in the refrigerating compartment and configured to cool a mixed gas supplied from the gas mixer and supply the cooled mixed gas into the one or more dry-aging rooms;
a humidity controller configured to supply moisture into the one or more dry-aging rooms; and
a controller configured to separately control the one or more dry-aging rooms, configured to set a ratio of the oxygen, the carbon dioxide, and the nitrogen, which are supplied into each of the one or more dry-aging rooms, to supply the mixed gas of the oxygen, carbon dioxide and nitrogen, and periodically detects the ratio of the oxygen, the carbon dioxide, and the nitrogen within the one or more dry-aging rooms so that, when the detected ratio is different from the set value, the vacuum pump is driven to vacuumize the insides of the one or more dry-aging rooms and to supply the mixed gas of the oxygen, carbon dioxide and nitrogen corresponding to the set value again into the one or more dry-aging room by using the gas mixer,
wherein a ratio of the carbon dioxide is fixed to 20%, the oxygen is contained at a ratio of 20% to 80%, and the nitrogen is contained at a ratio of 0% to 60%,
wherein, when the ratio of the oxygen increases, the controller supplies the mixed gas while decreasing the ratio of the nitrogen, and when the ratio of the oxygen decreases, the controller supplies the mixed gas while increasing the ratio of the nitrogen.

5. The dry aging system of claim 4, wherein, when the ratio of the nitrogen is 0%, the controller controls the humidity controller to allow humidity within the one or more dry-aging rooms to become 50%, and when the ratio of the nitrogen is 60%, the controller controls the humidity controller to allow the humidity within the one or more dry-aging rooms to become 15% to 20% so that when the ratio of the nitrogen is low, the humidity increases, and when the ratio of the nitrogen is high, the humidity decreases.

6. The dry aging system of claim 2, wherein a measuring sensor configured to measure and analyze the ratio of the oxygen, the carbon dioxide, and the nitrogen is provided in each of the one or more dry-aging rooms, and
the controller periodically detects the ratio of the oxygen, the carbon dioxide, and the nitrogen within each of the one or more dry-aging rooms by using the measuring sensor.

* * * * *